(12) United States Patent
Thornton et al.

(10) Patent No.: US 9,228,441 B2
(45) Date of Patent: Jan. 5, 2016

(54) PASSIVE THERMOSTATIC VALVE

(75) Inventors: Lane Thornton, Meriden, CT (US); Thomas N. Slavens, Vernon, CT (US)

(73) Assignee: United Technologies Corporation, Hartford, CT (US)

(*) Notice: Subject to any disclaimer, the term of this patent is extended or adjusted under 35 U.S.C. 154(b) by 898 days.

(21) Appl. No.: 13/477,671

(22) Filed: May 22, 2012

(65) Prior Publication Data
US 2013/0312425 A1 Nov. 28, 2013

(51) Int. Cl.
F02C 7/12 (2006.01)
F01D 5/18 (2006.01)
F02C 7/18 (2006.01)
F02C 6/08 (2006.01)
G05D 23/19 (2006.01)

(52) U.S. Cl.
CPC . F01D 5/187 (2013.01); F02C 6/08 (2013.01); F02C 7/185 (2013.01); F05D 2270/3062 (2013.01); G05D 23/1921 (2013.01)

(58) Field of Classification Search
CPC .............. F02C 7/185; F02C 6/08; F02C 7/16; F02D 11/24; F02D 25/12
USPC .................................................. 60/806, 782
See application file for complete search history.

(56) References Cited

U.S. PATENT DOCUMENTS

| | | | |
|---|---|---|---|
| 2,109,628 A | 3/1938 | Alban et al. | |
| 2,329,116 A | 9/1943 | Heilman | |
| 3,856,259 A * | 12/1974 | Doherty, Jr. | 251/11 |
| 3,949,549 A | 4/1976 | Holl | |
| 4,213,738 A | 7/1980 | Williams | |
| 4,666,081 A * | 5/1987 | Cook et al. | 236/68 R |
| 4,836,496 A * | 6/1989 | Abujudom et al. | 251/11 |
| 4,901,520 A | 2/1990 | Kozak et al. | |
| 5,022,817 A | 6/1991 | O'Halloran | |
| 5,555,721 A | 9/1996 | Bourneuf et al. | |
| 5,996,331 A | 12/1999 | Palmer | |
| 6,116,852 A | 9/2000 | Pierre et al. | |
| 6,485,255 B1 | 11/2002 | Care et al. | |
| 6,851,255 B2 | 2/2005 | Aitchison et al. | |
| 7,445,424 B1 | 11/2008 | Ebert et al. | |
| 2007/0243061 A1 | 10/2007 | Taylor et al. | |
| 2010/0154433 A1 | 6/2010 | Ottaviano et al. | |
| 2011/0162384 A1* | 7/2011 | Langdon et al. | 60/782 |
| 2013/0167377 A1* | 7/2013 | Gillespie | 29/890.124 |

FOREIGN PATENT DOCUMENTS

JP 05-010151 1/1993

OTHER PUBLICATIONS

International Preliminary Report on Patentabilbity for PCT Application No. PCT/US2013/039355 mailed Dec. 4, 2014.
International Search Report for International Application No. PCT/US2013/039355 completed on Aug. 23, 2013.

* cited by examiner

*Primary Examiner* — Gerald L Sung
(74) *Attorney, Agent, or Firm* — Carlson, Gaskey & Olds, P.C.

(57) ABSTRACT

An airfoil includes an airfoil body having an internal cavity. A thermostatic valve is located at least partially within the internal cavity. The thermostatic valve is configured to passively control fluid flow into the internal cavity in response to a temperature within the internal cavity.

17 Claims, 3 Drawing Sheets

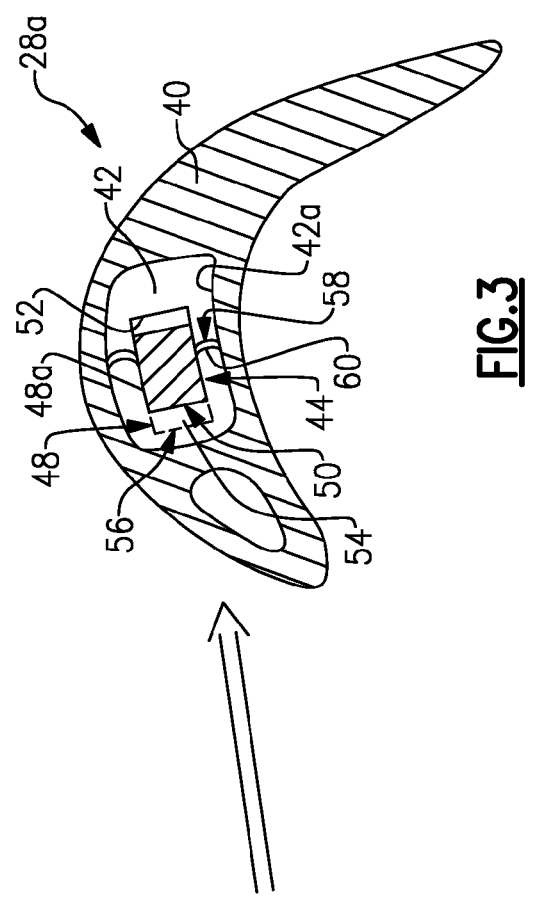
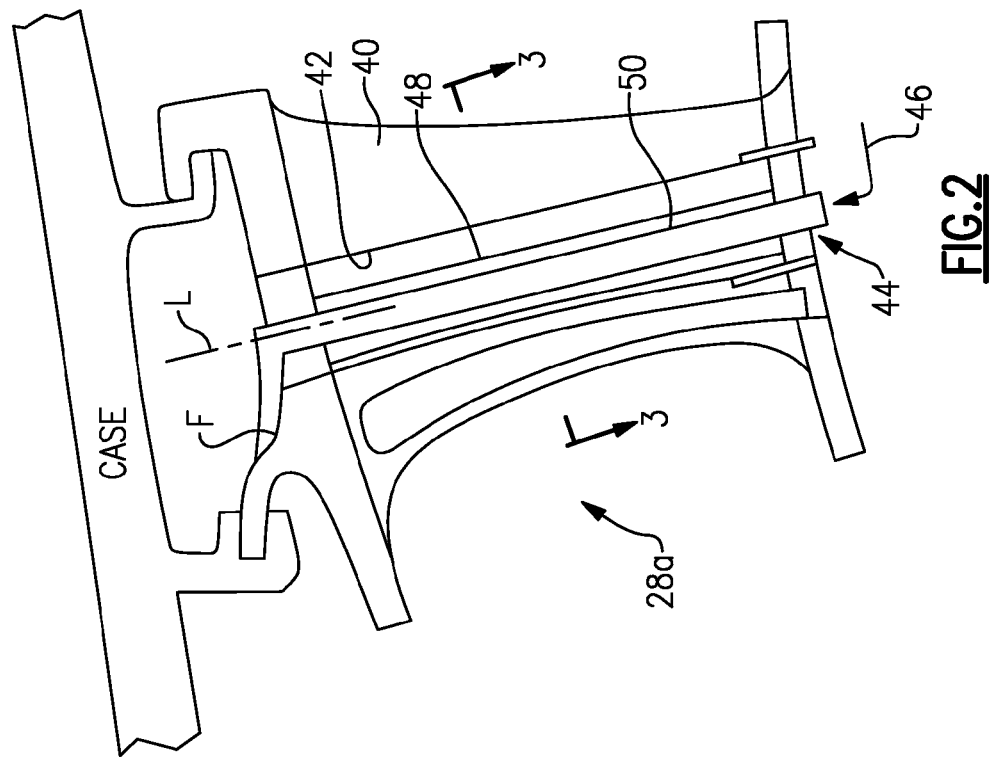

PASSIVE THERMOSTATIC VALVE

BACKGROUND

This disclosure relates to valves and, more particularly, to thermostatic valves that passively control fluid flow in response to temperature.

Machines, such as gas turbine engines, typically include components that operate at relatively high temperatures. A cooling system may be provided to maintain the components at a desired operating temperature. For example, in gas turbine engines, airfoils within a compressor or turbine of the engine may be provided with relatively cool air from another part of the engine. Typically, the cool air is circulated through an internal cavity in the airfoil to maintain the airfoil at a desired operating temperature. As an example, the relatively cool air is provided as a bleed flow from a portion of the compressor. However, the bleed flow debits engine efficiency.

SUMMARY

An airfoil according to an exemplary aspect of the present disclosure includes an airfoil body having an internal cavity and a thermostatic valve at least partially within the internal cavity and configured to passively control fluid flow into the internal cavity in response to a temperature within the internal cavity.

In a further non-limiting embodiment of any of the foregoing example, the thermostatic valve includes a multi-metallic actuator.

The airfoil as recited in claim 1, wherein the thermostatic valve includes a baffle member extending within the internal cavity, the baffle member having a hollow interior defining a flow passage and a discharge port in communication with the flow passage.

In a further non-limiting embodiment of any of the foregoing examples, the discharge port comprises a wall including a plurality of openings extending there through.

In a further non-limiting embodiment of any of the foregoing examples, the thermostatic valve includes a fixed baffle member and a movable baffle member relative to the fixed baffle member, wherein the movable baffle member circumscribes the fixed baffle member.

A further non-limiting embodiment of any of the foregoing examples includes a bearing interface between the fixed baffle member and the movable baffle member.

In a further non-limiting embodiment of any of the foregoing examples, the fixed baffle member is affixed at an exterior portion of the airfoil body and extends into the internal cavity.

In a further non-limiting embodiment of any of the foregoing examples, the fixed baffle member and the movable baffle member are elongated in a direction parallel to a longitudinal axis defined by the airfoil body.

A further non-limiting embodiment of any of the foregoing examples includes a multi-metallic member joining the movable baffle member and a wall of the interior cavity.

A turbine engine according to an exemplary aspect of the present disclosure includes, optionally, a fan, a compressor section, a combustor in fluid communication with the compressor section, and a turbine section in fluid communication with the combustor. The turbine section is coupled to drive the compressor section and the fan. At least one of the compressor section and the turbine section includes an airfoil that has an airfoil body having an internal cavity and a thermostatic valve at least partially within the internal cavity and configured to passively control fluid flow into the internal cavity in response to a temperature within the internal cavity.

In a further non-limiting embodiment of any of the foregoing examples, the thermostatic valve includes a baffle member extending within the internal cavity, the baffle member having a hollow interior defining a flow passage and a discharge port in communication with the flow passage.

In a further non-limiting embodiment of any of the foregoing examples, the thermostatic valve includes a fixed baffle member and a movable baffle member relative to the fixed baffle member, wherein the movable baffle member circumscribes the fixed baffle member.

A passive thermostatic valve according to an exemplary aspect of the present disclosure includes a first baffle member including a body having a hollow interior defining a flow passage and a discharge port in communication with the flow passage, a second baffle member extending within the hollow interior of the first baffle member, the second baffle being fixed relative to the first baffle, and a thermal actuator configured to passively move the first baffle member relative to the second baffle member between a plurality of positions influencing a flow through the discharge port and in response to a temperature.

In a further non-limiting embodiment of any of the foregoing examples, the thermostatic valve includes a multi-metallic actuator.

A further non-limiting embodiment of any of the foregoing examples includes a bearing interface between the first baffle member and the second baffle member.

In a further non-limiting embodiment of any of the foregoing examples, the discharge port comprises a wall including a plurality of openings extending there through.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 illustrates an example airfoil having a thermostatic valve.

FIG. 3 shows a cross-section through the airfoil and thermostatic valve of FIG. 2.

DETAILED DESCRIPTION

Figure 1:
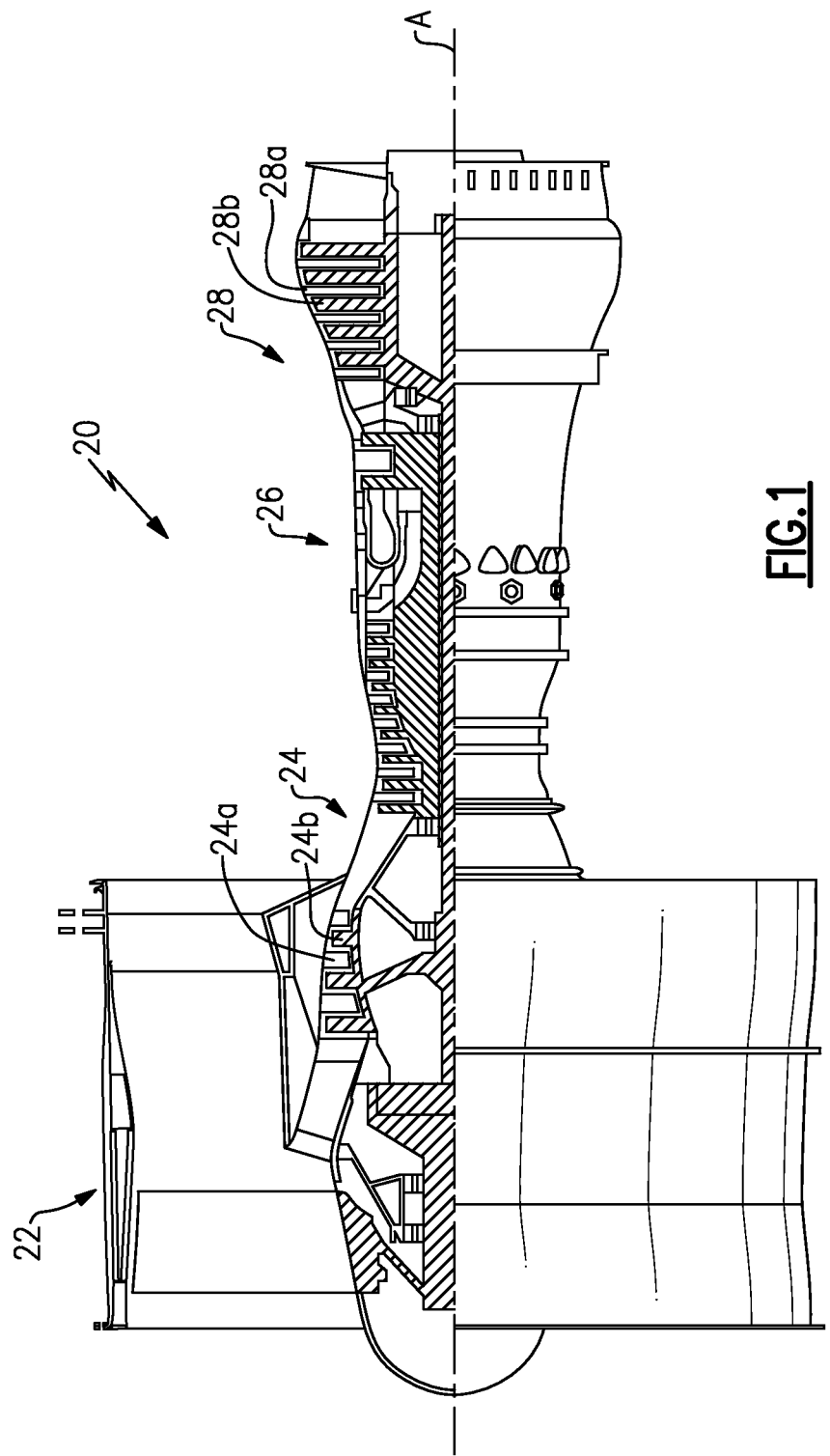
FIG. 1 shows an example gas turbine engine.

FIG. 1 schematically illustrates a gas turbine engine 20. The gas turbine engine 20 shown herein is a two-spool turbofan that generally includes a fan 22, a compressor section 24, a combustor 26 and a turbine section 28 arranged along an engine central axis A. Alternative engine configurations can include an augmentor section (not shown), among other systems or features.

As known, the fan section 22 drives air along a bypass flow path while the compressor section 24 drives air along a core flow path for compression and communication into the combustor 26 then expansion through the turbine section 28. Although depicted as a turbofan gas turbine engine in the disclosed non-limiting embodiment, it is to be understood that the examples described herein are not limited to use with turbofans and the teachings may be applied to other types of turbine engines, including single- or multi-spool architectures and ground-based gas turbine engines that do not include a fan.

The compressor section 24 includes compressor vanes 24a and compressor blades 24b. Similarly, the turbine section 28 includes turbine vanes 28a and turbine blades 28b. For purposes of this disclosure, the vanes 24a/28a and the blades 24b/28b are all considered to be airfoils.

FIG. 2 shows an example of one of the turbine vanes 28a. It is to be understood, however, that although the turbine vane 28a will be described below, the examples herein are applicable to the turbine blades 28b, compressor vane 24a and compressor blades 24b. Moreover, the examples herein can also be applied to other cooled components of a gas turbine engine or other type of machine.

Referring also to FIG. 3, the turbine vane 28a includes an airfoil body 40 having an internal cavity 42. A thermostatic valve 44 is located at least partially within the internal cavity 42. As will be described, the thermostatic valve 44 is configured to passively, without any electronic signals received into the thermostatic valve 44, control fluid flow 46 into the internal cavity 42 in response to a temperature within the internal cavity 42.

The thermostatic valve 44 includes a first, movable baffle member 48 and a second, fixed baffle member 50, which is fixed relative to the moveable baffle member 48. The movable baffle member 48 and the fixed baffle member 50 are generally elongated in a direction parallel to a longitudinal axis L of the turbine vane 28a. The fixed baffle member 50 extend from the interior cavity 42 and is affixed at an exterior location on the airfoil body 40.

The movable baffle member 48 includes a body 48a having a hollow interior 52 that defines a flow passage 54 there through for receiving the fluid flow 46 to cool the turbine vane 28a. The body 48a also has a discharge port 56 that is in communication with the flow passage 54 for discharging the fluid flow 46 into the interior cavity 42. In this example, the discharge port 56 includes a wall 56a having a plurality of openings 56b extending there through.

The fixed baffle member 50 extends within the hollow interior 52 of the movable baffle member 48 such that the body 48a of the movable baffle member 48 circumscribes the fixed baffle member 50, as shown in FIG. 3. The moveable baffle member 48 and the fixed baffle member 50 are in contact at a bearing interface B (FIGS. 4 and 5).

The thermostatic valve 44 further includes a thermal actuator 58 that is configured to passively move the movable baffle member 48 relative to the fixed baffle member 50 between a plurality of positions influencing flow through the discharge port 56 in response to a temperature within the internal cavity 42. In this example, the thermal actuator 58 is or includes a multi-metallic actuator 60 that joins the movable baffle member 48 and a wall 42a of the internal cavity 42.

Figure 5:
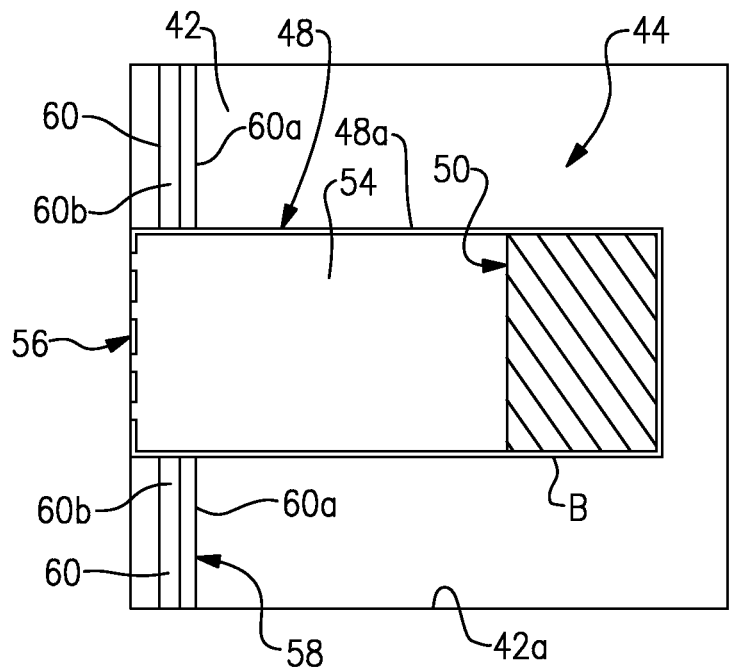
FIG. 5 shows the thermostatic valve of FIG. 4 but in a closed position.
Figure 4:
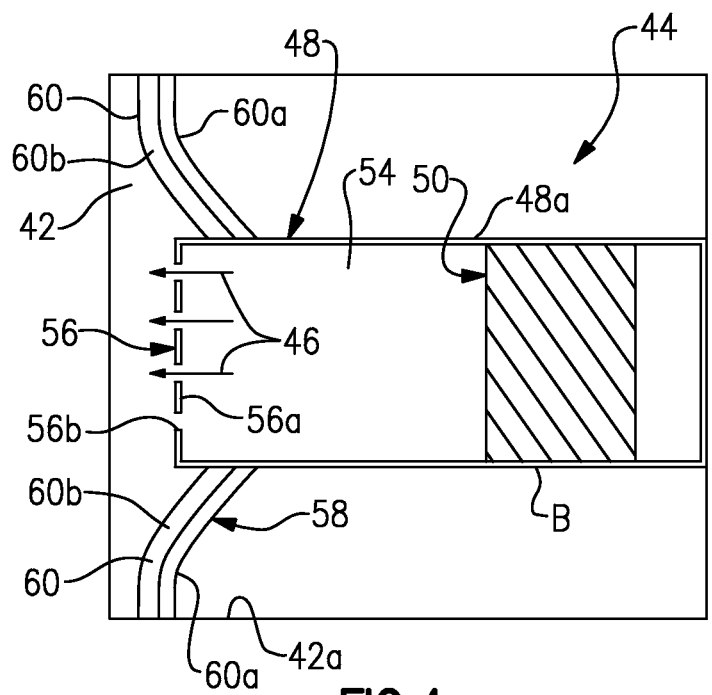
FIG. 4 shows a thermostatic valve in an open position.

FIG. 4 shows the thermostatic valve 44 in an open position and FIG. 5 shows the thermostatic valve 44 in a closed position. In the open position as shown in FIG. 4, the fluid flow 46 flows through the flow passage 54 within the movable baffle member 48 and out through the discharge port 56 into the internal cavity 42 of the airfoil body 40. Thus, in the open position, the thermostatic valve 44 permits the airflow 46 into the internal cavity 42 to cool the turbine vane 28a.

In response to a change in temperature within the internal cavity 42 to a lower temperature, the thermal actuator 58 moves the movable baffle member 48 to a closed position, as shown in FIG. 5. In this example, the multi-metallic actuator 60 of the thermal actuator 58 urges the movable baffle member 48 toward a closed position in which the discharge port 56 abuts the wall 42a of the internal cavity 42 to close or limit the fluid flow 46 into the internal cavity 42.

As an example, the multi-metallic actuator 60 includes a first metal layer 60a and a second, different metal layer 60b that is adjacent the first metal layer 60a. It is to be understood that additional metal layers can be used. The metal layers 60a/60b can be bonded together or can be unbounded. The metal layers 60a/60b have different compositions and thus different coefficients of thermal expansion such that the differing coefficients of thermal expansion cause actuation with temperature change.

The thermostatic valve 44 need not receive any electronic signals to actuate the movable baffle member 48 and control the airflow 46 into the internal cavity 42. Therefore, the thermostatic valve 44 modulates cooling of the turbine vane 28a passively, depending upon the temperature within the internal cavity 42, which can vary with operation of the engine 20 (e.g., take-off, landing, cruise, etc.). Further, the airfoils within the gas turbine engine 20 can require different levels of cooling than other airfoils, and thus passively modulating the fluid flow 46 based on the individual temperature within an airfoil ensures that a proper amount of fluid flow 46 is received into each airfoil, without excess flow or a deficiency of flow. The modulation of the fluid flow 46 thereby efficiently utilizes compressor bleed air and thus improves the efficiency of the operation of the engine 20.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An airfoil comprising:
   an airfoil body having an internal cavity; and
   a thermostatic valve at least partially within the internal cavity and configured to passively control fluid flow into the internal cavity in response to a temperature within the internal cavity, the thermostatic valve including a moveable baffle member and a fixed baffle member, the moveable baffle member having a hollow interior defining a flow passage and a discharge port in communication with the flow passage and the fixed baffle member being disposed in the hollow interior of the moveable baffle member.

2. The airfoil as recited in claim 1, wherein the thermostatic valve includes a multi-metallic actuator.

3. The airfoil as recited in claim 1, wherein the discharge port comprises a wall including a plurality of openings extending there through.

4. The airfoil as recited in claim 1, wherein the movable baffle member circumscribes the fixed baffle member.

5. The airfoil as recited in claim 4, including a bearing interface between the fixed baffle member and the movable baffle member.

6. The airfoil as recited in claim 4, wherein the fixed baffle member is affixed at an exterior portion of the airfoil body and extends into the internal cavity.

7. The airfoil as recited in claim 4, wherein the fixed baffle member and the movable baffle member are elongated in a direction parallel to a longitudinal axis defined by the airfoil body.

8. The airfoil as recited in claim 4, further comprising a multi-metallic member joining the movable baffle member and a wall of the interior cavity.

9. The airfoil as recited in claim 1, wherein the moveable baffle member is moveable with respect to a wall of the internal cavity such that in a closed position the discharge port abuts the wall to limit flow and in an open position the discharge port is spaced from the wall to permit greater flow.

10. A turbine engine comprising:
a compressor section;
a combustor in fluid communication with the compressor section; and
a turbine section in fluid communication with the combustor, the turbine section being coupled to drive the compressor section, and at least one of the compressor section and the turbine section including an airfoil comprising an airfoil body having an internal cavity and a thermostatic valve at least partially within the internal cavity and configured to passively control fluid flow into the internal cavity in response to a temperature within the internal cavity, the thermostatic valve including a moveable baffle member and a fixed baffle member, the moveable baffle member having a hollow interior defining a flow passage and a discharge port in communication with the flow passage, and the fixed baffle member being disposed in the hollow interior of the moveable baffle member.

11. The engine as recited in claim 10, wherein the movable baffle member circumscribes the fixed baffle member.

12. The engine as recited in claim 10, wherein the moveable baffle member is moveable with respect to a wall of the internal cavity such that in a closed position the discharge port abuts the wall to limit flow and in an open position the discharge port is spaced from the wall to permit greater flow.

13. The engine as recited in claim 10, further comprising a fan coupled to be driven by the turbine section.

14. A passive thermostatic valve comprising:
a first baffle member including a body having a hollow interior defining a flow passage and a discharge port in communication with the flow passage;
a second baffle member extending within the hollow interior of the first baffle member, the second baffle being fixed relative to the first baffle; and
a thermal actuator configured to passively move the body of the first baffle member relative to the second baffle member between a plurality of positions influencing a flow through the discharge port and in response to a temperature.

15. The passive thermostatic valve as recited in claim 14, wherein the thermostatic valve includes a multi-metallic actuator.

16. The passive thermostatic valve as recited in claim 15, including a bearing interface between the first baffle member and the second baffle member.

17. The passive thermostatic valve as recited in claim 14, wherein the discharge port comprises a wall including a plurality of openings extending there through.

* * * * *